May 26, 1964 H. M. ZEUTSCHEL 3,134,589

DATA PROCESSING SYSTEM

Filed Nov. 18, 1960 3 Sheets-Sheet 1

*INVENTOR.*

HEINZ M. ZEUTSCHEL

*BY* David A. Rich

ATTORNEY

May 26, 1964 H. M. ZEUTSCHEL 3,134,589

DATA PROCESSING SYSTEM

Filed Nov. 18, 1960 3 Sheets-Sheet 2

*INVENTOR.*

HEINZ M. ZEUTSCHEL

*BY* David A. Rich

ATTORNEY

May 26, 1964 H. M. ZEUTSCHEL 3,134,589

DATA PROCESSING SYSTEM

Filed Nov. 18, 1960 3 Sheets-Sheet 3

INVENTOR.
HEINZ M. ZEUTSCHEL
BY David A. Reich
ATTORNEY 3,134,589

DATA PROCESSING SYSTEM

Heinz M. Zeutschel, Stuttgart, Germany, assignor to Itek Corporation, Waltham, Mass., a corporation of Delaware Filed Nov. 18, 1960, Ser. No. 70,164
11 Claims. (Cl. 271—30)

This invention relates to data processing systems and more particularly to an improvement in data processing systems of the type having a plurality of parallel guide means along which are transported pneumatically a plurality of data-bearing sheets which are processed according to a predetermined instruction program.

This invention relates to a data processing system of the type which is illustrated, described, and claimed in the copending application of W. Gordon Welchman, Serial No. 38,334, filed June 23, 1960, for "Data Processing Apparatus." Said Welchman application is assigned to the assignee of this application. This invention is also applicable to other data processing systems wherein a plurality of data-bearing sheets are transported pneumatically along a given path for processing at stationas located at different points along said path.

Described briefly, the system disclosed in the aforesaid application Serial No. 38,334, hereinafter identified as the "Welchman system," comprises a plurality of guide rails, preferably four, along which data-bearing sheets such as film chips are transported pneumatically. These film chips are provided with identifying codes, preferably magnetically recorded, which are sensed by a transducer located at a preselected point alongside their path of travel. In the Welchman system, selected film chips may be isolated and projected onto a screen without removal from the system, or they may be extracted from the system for use in a separate device or environment. Chips may be extracted from the system by collecting them at the end of the guide rails or by removing them at intermediate points upstream of the regular collection point through gaps formed in the rails. Suitable trapping and ejecting means are utilized to extract chips through these gaps.

In the Welchman system, the data-bearing sheets, e.g., film chips, are transported along the guide rails in single-file fashion and at high speeds. Accordingly, very little time elapses from the moment the chips are started on their way along the rails to the moment they reach their destination. Because of this brief time interval, it is absolutely essential that the chips be spaced in a more or less uniform manner. If this were not the case, more than one chip at a time would pass the sensing station and an erroneous output would result from the sensing station since the latter would be unable to distinguish one chip from another. Moreover, unless the chips are separated, complications will arise where it is desired to extract a chip. The presence of more than one chip at an extraction stage will produce jamming or will prevent the desired chip from being extracted according to the normal procedure. Furthermore, if successive chips are too close to each other, it becomes overly difficult to isolate a single chip for screening through an internal optical system such as the one claimed in my copending application Serial No. 42,356, filed July 12, 1960, for Optical Projection System, said application assigned to the assignee of this application.

Accordingly, the primary object of the present invention is to provide means for rapidly feeding film chips in single-file fashion into a guide rail system of a data processing apparatus.

A more specific object of the present invention is to provide means for separating chips from a supply thereof and for pneumatically feeding them into a guide rail system of a data processing apparatus.

A further specific object of the present invention is to provide means for producing two air streams angularly directed into a guide rail system of a data processing apparatus, the two streams cooperating together to effect a separation of data processing sheets mounted on the guide rail system and to propel successively separated sheets along the rails at a relatively high speed.

Other objects and many of the attendant advantages of the present invention will become readily apparent and appreciated as reference is had to the following detailed specification when considered together with the accompanying drawings wherein.

Figures 1, 2, 3, 5:
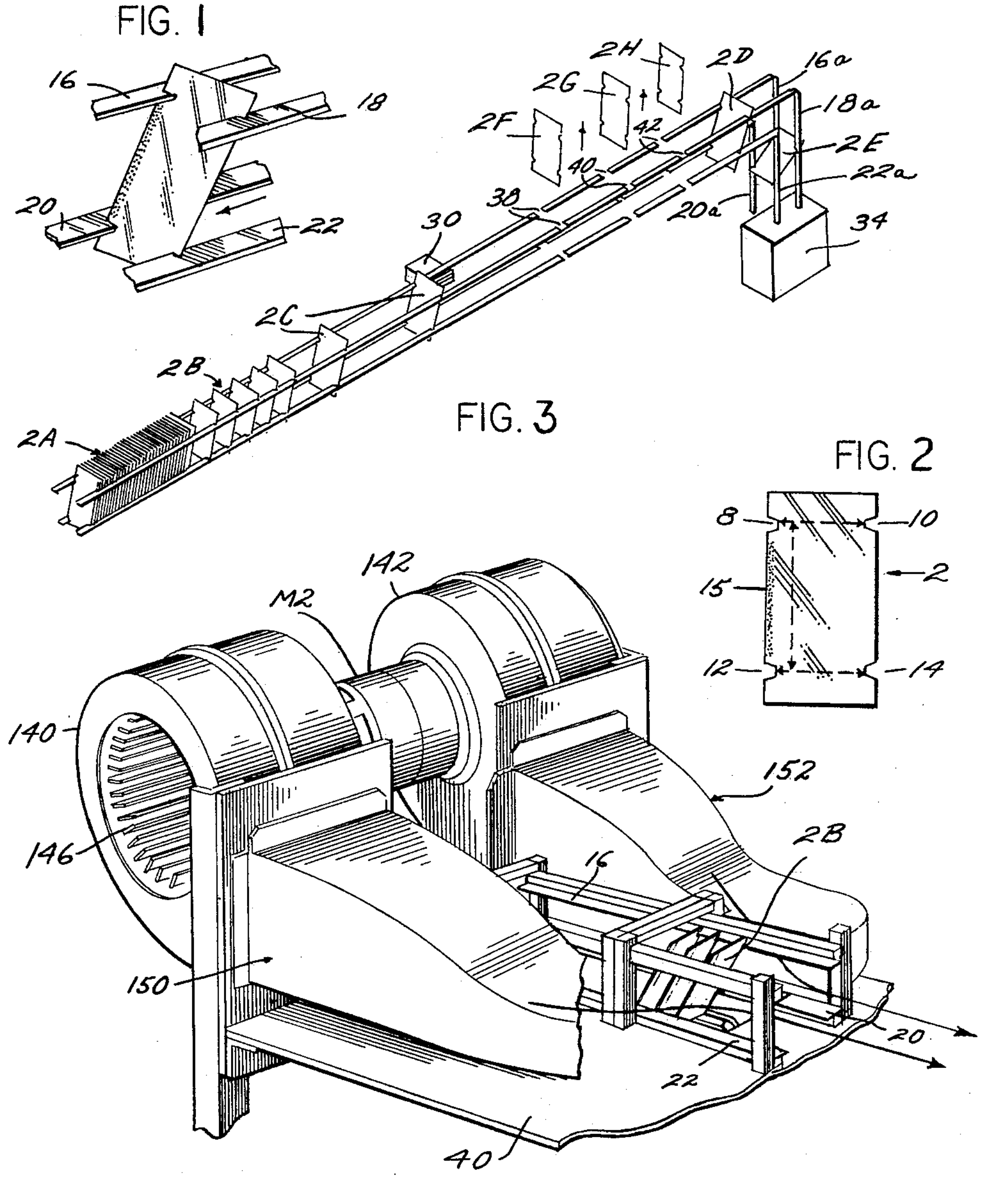
FIG. 1 is a perspective view showing a typical film chip positioned on four parallel rails which form part of a Welchman data processing system.
FIG. 2 is a front elevation of a typical film chip.
FIG. 3 is a schematic representation of a portion of the data processing system described and illustrated in the aforementioned Welchman application Serial No. 38,334.
Figures 4, 7:
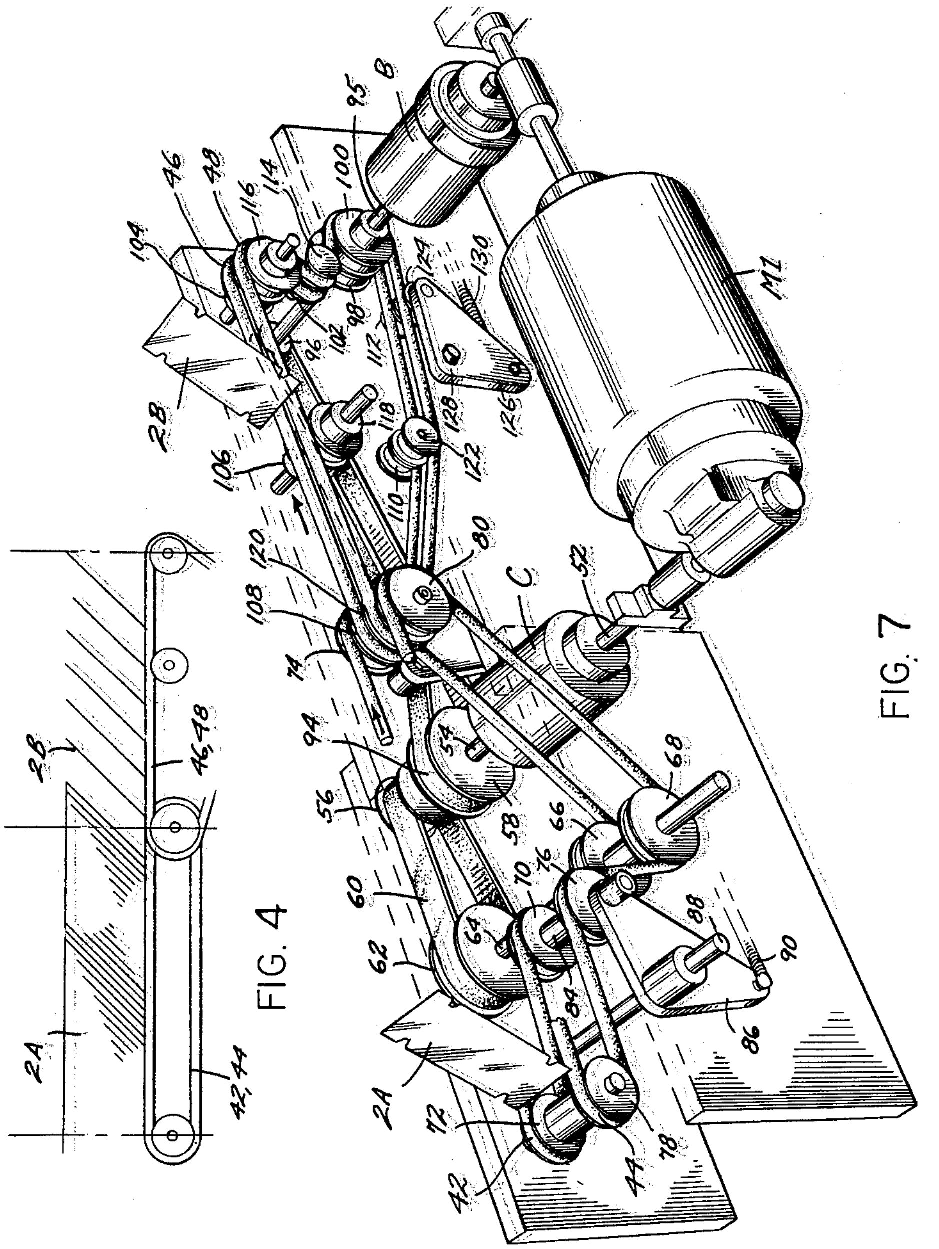
Figure 6:
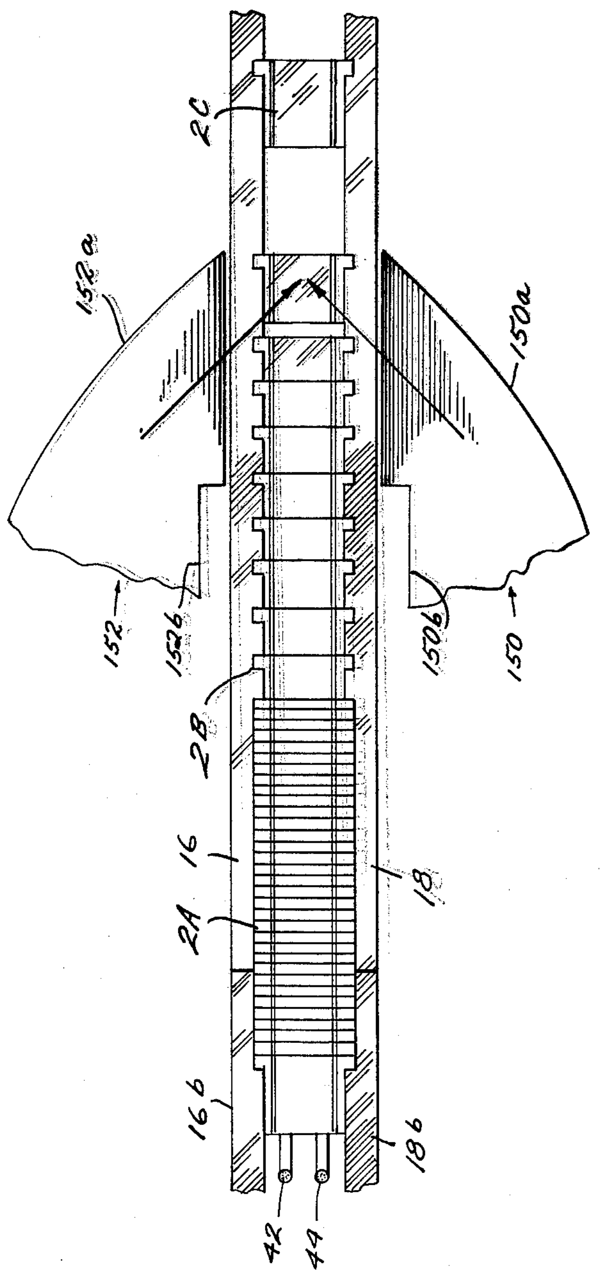

FIG. 4 schematically illustrates how chips are initially separated from a chip supply by means of a dual speed conveyor belt system;

FIG. 5 is a perspective view illustrating the apparatus for generating and directing the air streams which pneumatically separate film chips and propel them along the guide rail system;

FIG. 6 is a schematic plan view illustrating how the chips are transported and spaced by the conveyor belt system and by the pneumatic air stream system; and FIG. 7 is a perspective view illustrating details of the dual speed conveyor belt system.

Referring now to FIGURES 1, 2, and 3, the Welchman system makes use of a data-bearing sheet 2 of rectangular configuration having four notches 8, 10, 12, and 14 cut in its two elongated side edges. Although not visible, it is to be understood that the sheet 2 is capable of carrying data in a form suitable for reproduction and/or direct readout. In the preferred embodiment of the invention, the data-bearing sheet 2 is a segment of film commonly called a "film chip" on which data can be recorded in the form of discrete negative images. Also in the preferred embodiment, the data-bearing sheet 2 bears an identifying code which is magnetically recorded in a magnetic striping 15 which is applied along one edge of a data-bearing sheet 2. Although not shown, it is to be understood that a second magnetic striping may be applied along the opposite edge of the data-bearing sheet.

The notches 8, 10, 12, and 14 which are formed in the data-bearing sheets are for the purpose of accommodating guide rails generally identified as 16, 18, 20, and 22, respectively. Sections of these guide rails are illustrated in FIGURE 1. The top guide rails 16 and 18 are so disposed with respect to the bottom guide rails 20 and 22 that a data-bearing sheet 2 can be accommodated simultaneously by all four rails only if it is oriented at an inclined angle. Preferably, the spacing between the top and bottom rails is such that when a data-bearing sheet is supported on the guide rails, the sheet will be maintained at an angle of approximately 45 degrees. In the following specification, it is to be understood that the data-bearing sheets are all inclined at an angle of approximately 45 degrees to the guide rails.

The size of the notches 8, 10, 12, and 14 is such as to substantially eliminate up-and-down or side play relative to the guide rails while at the same time permitting the data-bearing sheets to be moved along the rails at a high rate of speed under the influence of a relatively small air pressure gradient.

Referring now to FIGURE 3, the system is adapted to accommodate a supply of film chips generally identified as 2A. The supply of film chips 2A is disposed at the upstream end of the guide rail system. Initially these chips are relatively tightly packed. In accordance with the present invention, means (not shown) are employed to effect an initial separation of the chips from the supply stack 2A, the initial separation of chips being indicated at 2B. Thereafter, by means of the present invention, the chips are further separated pneumatically and propelled down the rails at a relatively high rate of speed, as indicated at 2C in FIGURE 3.

As the chips are propelled down the rails, they pass a transducer 30 which is located so as to read identifying codes recorded on the magnetic stripings 15. The transducer 30 is connected to a logic system (not shown) which produces an output signal each time a desired code is detected. This output signal is used to control apparatus (not shown) which is designed to perform a selected function with respect to a chip having the desired code. Thus, for example, in the aforementioned Welchman system, the output signal is used to control an optical system which is claimed in my aforementioned copending application Serial No. 42,356, filed July 12, 1960, for "Optical Projection System." This optical system is designed to stop a chip at a given point in its path of travel along the guide rails and to project the data image in the chip on a suitable screen for observation or reproduction. Suitable means are also provided for stopping all chips upstream of a selected chip, pending utilization of the selected chip. The optical system and the means for stopping chips upstream of the selected chip are not shown or described herein since they form no part of the present invention. However, reference may be had to the aforementioned applications for specific details. All sheets which are maintained in the system are delivered to a suitable output station. In FIGURE 3, this output station is indicated as a box-like container 34 which is disposed below downwardly oriented extensions *16a, 18a, 20a,* and *22a* of the 4-rail system. It is a distinctive feature of the Welchman system that chips may be made to negotiate a 90° turn on the tracks. In making a 90° turn, the angular position of the chips is reversed. Such a turn is accomplished by chips in the system of FIGURE 3 as the travel from tracks 16—22 to the container 34 via extension *16a—22a*. In FIGURE 3, chips 2D and 2E illustrate how the angular position is reversed. Chip 2D is seen approaching the 90° turn with its top end leading its bottom end, and chip 2E is seen moving downstream away from the same corner with its bottom end now leading its top end.

A further distinctive feature of the Welchman system is that it lends itself to removal of chips at selected points along the system. It has been determined that if gaps are made in the upper and lower rails at substantially the same point, a chip traveling along at an inclined angle will jump the gaps without any difficulty. However, by means of suitable trapping and ejecting elements, chips may be extracted from the guide rail system through the gaps therein. In FIGURE 3 there is shown a plurality of gaps 38, 40, and 42 located downstream of each other. Means (not shown) may be utilized to selectively effect upward removal of chips from each set of gaps, as indicated by the chips 2F, 2G, and 2H. Specific means for effecting removal of chips from the Welchman 4-rail system are illustrated and described in the copending application of W. Gordon Welchman and Heinz M. Zeutschel Serial No. 58,114, filed September 23, 1960, now Patent No. 3,042,199, entitled "Data Processing System." This application is assigned to the assignee of the present application.

The present invention makes use of the principle that if two air streams are directed into the guide rail system from opposite sides and at an angle to the axis thereof, they will produce a resultant air stream along said axis which will effect a rapid separation of chips and propel them along the rails at a relatively high speed and in a relatively even spacing. A more complete description of the nature and mode of operation of the invention is provided hereinafter in connection with the description of the preferred embodiment of the invention.

Turning now to FIGURE 5, there is illustrated the upstream or infeed portion of a data processing machine embodying the present invention as applied to a Welchman system. This machine comprises a flat, horizontal supporting table 40 which carries all of the components of the machine, including the supporting structure for the rails 16, 18, 20, and 22 as well as the control and data processing circuitry. The upstream or infeed end of the guide rail system is the situs of the present invention, the function of the latter being to feed and propel chips one by one along the rails at a relatively high speed.

Referring now to FIGURES 4, 5, and 7, the present invention includes a pair of low-speed belts 42 and 44 and a pair of high-speed belts 46 and 48. These belts are mounted on a pulley system which is driven from an electric motor M1.

The motor M1 has an output shaft 52 which is connected by an electromagnetic clutch C to a main shaft 54 which carries two main drive pulleys 56 and 58. Pulley 56 drives a belt 60 which, in turn, drives a pulley 62 mounted on a shaft 64. Shaft 64 drives two pulleys 66 and 68 which drive belts 42 and 44. It is to be noted that belt 42 travels in turn about drive pulley 66, a takeup pulley 70, and two guide pulleys 72 and 74. Similarly, belt 44 travels about drive pulley 68, a takeup pulley 76, and two guide pulleys 78 and 80. The two takeup pulleys 70 and 76 are mounted on a common shaft 84 which is carried by an arm 86 that is mounted for pivoting on a shaft 88. A tension spring 90 urges arm 86 in a direction to keep the takeup pulleys 70 and 76 in firm engagement with the belts 42 and 44 so as to substantially eliminate any slack in these belts.

The other main drive pulley 58 drives a belt 94 which drives a shaft 95 through a main pulley 96 that is mounted on the end of shaft 95. Shaft 95 is coupled to an electromagnetic brake B whose housing is stationary. Also mounted on shaft 95 are two drive pulleys 98 and 100 over which ride the two belts 46 and 48, respectively. These belts also ride in turn over a plurality of idler pulleys. Belt 46 rides on idler pulleys 102, 104, 106, 108, and 110. Also, belt 46 also rides on a takeup pulley 112. Belt 48 rides about the aforementioned pulley 100 and also over guide pulleys 114, 116, 118, 120, and 122. Belt 48 also rides over a second takeup pulley 124. The two takeup pulleys, 112, and 124, are mounted on a common shaft which it attached to an arm 126 which is pivotally mounted at 128. A tension spring 130 acts on arm 126 to maintain the two takeup pulleys 112 and 124 in tight engagement with the belts 46 and 48, thereby to eleminate slack in the latter.

The ratios between the pulleys of the two conveyor belt systems, e.g., between pulleys 56 and 58, are such that when motor M1 is energized, the two belts 42 and 44 will be driven at a speed which is substantially lower than the speed at which the two belts 46 and 48 are driven. It is to be noted that the two pairs of belts are driven from the motor M1 only so long as the clutch C is engaged. The clutch C is engaged only when energized. At the same time, it is to be noted that if the clutch is disengaged, the belts will tend to continue traveling in the same direction. However, if at the same moment that the clutch C is disengaged the brake B is engaged, the belts will be halted immediately so as to have little or no over-travel. Brake B is engaged only when de-energized. Of course, clutch C and brake B are of conventional construction and may be replaced by suitable equivalent clutching and braking devices. It is to be observed that the electrical controlled circuitry for clutch C and brake B is not illustrated for the reason that it forms no part of the present invention. It is sufficient to note that the belts are operated through clutch C and they can be stopped by the operation of brake B.

The foregoing operating mechanism for the belts 42, 44, 46 and 48 is located on the underside of table 40. Mounted on the upper side of table 40 is a pair of air blowers 140 and 142 having rotating vane assembly 146 which are driven by a common fan motor M2. The two fans 140 and 142 are connected in series with two ducts 150 and 152, respectively, which curve inwardly at approximately the same point to form an air junction with the guide rail system.

The two ducts 150 and 152 curve inwardly toward the four rails at the downstream end of the fast feed belts 46 and 48. The latter extend into the region between the outlets of the two air ducts and terminate, i.e., reverse direction, approximately at the midpoint of the outlets of the two air ducts. The two ducts 150 and 152 curve inwardly toward the rails in such a manner that the air flowing along next to their outside walls 150*a* and 152*a*, respectively, enters the guide rail system at an angle approximately 45° to the axis thereof. On the other hand, air flowing along next to the inner walls 150*b* and 152*b* of the ducts enters the 4-rail system at an angle approximately perpendicular to the axis of the rail system. Due to the different angles at which air from the two ducts enters the 4-rail system, it appears that there is a definite change in air pressure and direction of air flow in the channel in the region of the outlets of the two ducts. The rapid change in pressure appears to be at approximately the midpoint of the two outlets. A slight back pressure is created in the channel upstream of the duct outlets, whereas on the downstream side of the duct outlets, the air streams from the two ducts produce a resultant air stream which is directed along the axis of the guide rail system away from the fans. The back pressure is insufficient to retard the chips or to drive them backward in opposition to the drag exerted by belts 46 and 48. Thus, the chips will advance at a constant rate along the rails until they reach approximately the midpoint of the two duct outlets where, as pointed out previously, there is a relatively sharp change in pressure and direction of air flow.

FIGURES 4 and 6 illustrate what happens to the chips from the time they are deposited onto the belts 42 and 44 to the time when they are exposed to the air flow from the two ducts 150 and 152. In practice, the closely stacked chips 2A are disposed over the belts 42 and 44 and are advanced by the latter at a constant, relatively low speed. When these chips reach the belts 46 and 48, they are picked up by the latter and transported at the speed of these belts, which is substantially higher than that of the speed of the belts 42 and 44. Thus, there is effected initial spacing of the chips as indicated at 2B. The spacing of the chips 2B is determined by the difference in relative speeds between the belts 46, 48 and the belts 42, 44. Preferably this initial spacing is of the order of 1/16 to 1/2 inch. This initial spacing is maintained by the chips as they are transported by the belts 46 and 48 toward the outlets of the ducts 150 and 152. However, as soon as the chips reach approximately the midpoint of the two duct outlets, the leading film chip will suddenly be propelled forward due to the change in air pressure and direction of air flow. In effect, therefore, the noticeable change in air pressure and direction of air flow occurring in the channel about halfway along the zone between the two duct outlets produces a new spacing between the film chips. This spacing action is similar to the spacing action which occurs when the chips are transferred from the slow moving conveyor belts 42 and 44 onto the relatively fast moving conveyor belts 46 and 48. However, there is a difference in the speed at which the film chips are propelled by the air stream, this speed being substantially in excess of the speeds which are produced by the conveyor belts. As soon as the chips reach the midpoint of the zone between the two duct outlets, they take off and literally zoom down the rails at speeds in the neighborhood of 100 to 700 inches per second. In a typical installation, this means that the chips are fed along at a rate of 50 chips per second or approximately 3,000 chips per minute. The magnitude of the air pressure gradient which is required to propel the chips along the rails is relatively small due to the fact that the chips are light-weight elements and that there is relatively little friction between the chips and the rails. Therefore, due to the fact that the overall length of travel of the chips on the rails is relatively short, the chips will travel at a relatively constant speed.

The use of two air ducts 150 and 152 instead of only one is important. Since they are directed toward the four rails at an angle to the axis of the four rails, the two air streams from the ducts produce two results. First of all, they produce an increased and uinform spacing between the chips. Secondly, they produce a resultant air stream which causes the chips to be propelled along the rails at a relatively high speed. A further advantage of the two ducts is that the air flow from each duct can be at a much lower pressure than would be the case from one duct, thereby reducing noise. Moreover, since the two ducts oppose each other and are identical in construction and orientation, the relatively weak cross-wise components of the two duct outputs effectively cancel each other whereas the downstream components reinforce each other to produce a resultant stream of sufficient intensity to propel the chips forward at a high rate of speed. In canceling out each other, the cross-wise components produce very little turbulence and only a minor amount of back pressure, both conditions helping to achieve the desired function of pneumatically separating the leading chips and propelling them down the rails in single-file fashion.

It is to be noted that in practice the chips are supplied in a four-rail magazine adapted to be mounted on the upstream end of the machine with its rails in abutting relation with the upstream ends of the guide rails 16, 18, 20, and 22. The conveyor belts 42 and 44 will extend under the magazine so as to permit it to feed all of the chips as a unit from the magazine onto the guide rails 16, 18, 20, and 22. In FIGURE 6, the top rails of such a magazine are indicated at 16*b* and 18*b*.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

What is claimed is:

1. In a data processing apparatus for handling and identifying data-bearing sheets each provided with encoded indicia, said apparatus including a plurality of elongated guide rails for supporting data-bearing sheets, means supporting said guide rails in parallel spaced relation to each other whereby said rails define a channel along which said information-bearing sheets may be transported, and means for scanning the encoded indicia on each sheet as said each sheet passes a predetermined point along said channel, the improvement comprising means at one end of said channel for feeding a stack of said sheets on said guide rails in the direction of the other end of said channel at a first rate, and means located at a selected zone adjacent said one end of said channel for producing an air stream directed so that as each sheet reaches a given point in said zone it will be separated from the rest of said stack and be propelled toward the opposite end of said channel at a second rate relatively faster than said first rate.

2. In a data processing apparatus having a plurality of parallel guide means for supporting data-bearing sheets at their edges, said guide means defining a channel along which said data-bearing sheets may be transported, the improvement comprising means at one end of said guide means for feeding a plurality of relatively closely spaced sheets onto said guide rails at a first rate, and means for pneumatically separating said spaced sheets and propelling them along said channel at a second rate relatively faster than said first rate.

3. The combination of claim 2 wherein said last-mentioned means comprises first and second ducts located at opposite sides of said channel, said ducts arranged to direct separate air streams into said channel.

4. The combination of claim 3 wherein said ducts are arranged so that said separate air streams will combine to produce a resultant air stream directed along the axis of said channel.

5. The combination of claim 3 wherein said ducts are arranged so that said separate air streams will have identical flow patterns where they enter said channel, each flow pattern including an upstream section wherein the general direction of flow is at a right angle to said channel and a downstream section wherein the general direction of flow is at an acute angle to said channel.

6. The combination of claim 5 wherein said acute angle is about 45 degrees.

7. The combination of claim 3 further including first and second fans for producing air streams in said ducts.

8. The combination of claim 7 wherein said fans are directly coupled to and driven by a common electric motor.

9. The combination of claim 2 wherein said slow-speed sheet-feeding means comprises an endless belt conveyor.

10. The combination of claim 2 wherein said guide means are arranged to support said sheets in parallel relation to each other but at an oblique angle to the axis of said channel.

11. The combination of claim 2 wherein said sheets are film chips.

References Cited in the file of this patent

UNITED STATES PATENTS

| | | |
|---|---|---|
| 2,342,680 | Melzer | Feb. 29, 1944 |
| 3,042,199 | Welchman et al. | July 3, 1962 |